United States Patent
Kreczinski et al.

(10) Patent No.: US 10,669,293 B2
(45) Date of Patent: Jun. 2, 2020

(54) PROCESS FOR PREPARING ISOCYANATES CONTAINING ALKOXYSILANE GROUPS

(71) Applicant: Evonik Degussa GmbH, Essen (DE)

(72) Inventors: Manfred Kreczinski, Herne (DE);
Stephan Kohlstruk, Gladbeck (DE);
Dirk Hoppe, Nottuln (DE);
Emmanouil Spyrou, Schermbeck (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/356,081

(22) Filed: Mar. 18, 2019

(65) Prior Publication Data
US 2019/0300553 A1    Oct. 3, 2019

(30) Foreign Application Priority Data
Mar. 28, 2018 (EP) .................................... 18164578

(51) Int. Cl.
*C07F 7/20* (2006.01)
*C07F 7/18* (2006.01)

(52) U.S. Cl.
CPC ............. *C07F 7/20* (2013.01); *C07F 7/1804* (2013.01); *C07F 7/1892* (2013.01)

(58) Field of Classification Search
None
See application file for complete search history.

(56) References Cited

U.S. PATENT DOCUMENTS

| | | | |
|---|---|---|---|
| 3,598,852 A | 8/1971 | Berger | |
| 3,821,218 A * | 6/1974 | Berger ................. | C07F 7/0892 544/221 |
| 4,654,428 A | 3/1987 | Kurashima et al. | |
| 4,697,009 A | 9/1987 | Deschler et al. | |
| 5,218,133 A | 6/1993 | Pepe et al. | |
| 5,393,910 A | 2/1995 | Mui et al. | |
| 5,616,762 A | 4/1997 | Kropfgans et al. | |
| 5,886,205 A | 3/1999 | Uchida et al. | |
| 6,008,396 A | 12/1999 | Sheridan et al. | |
| 6,388,117 B2 | 5/2002 | Pinske | |
| 9,309,271 B2 | 4/2016 | Simandan et al. | |
| 9,593,135 B2 * | 3/2017 | Spyrou ................. | C07F 7/1892 |
| 9,862,673 B2 | 1/2018 | Rüfer et al. | |
| 9,868,702 B2 | 1/2018 | Rüfer et al. | |
| 10,093,605 B2 | 10/2018 | Bajus et al. | |
| 10,093,765 B2 | 10/2018 | Stache et al. | |
| 10,093,826 B2 | 10/2018 | Stache et al. | |
| 10,125,089 B2 | 11/2018 | Kohlstruk et al. | |
| 10,160,717 B2 | 12/2018 | Rüfer et al. | |
| 10,173,979 B2 | 1/2019 | Rüfer et al. | |
| 10,214,612 B2 | 2/2019 | Langkabel et al. | |
| 10,221,277 B2 | 3/2019 | Langkabel et al. | |
| 2015/0274760 A1 | 10/2015 | Spyrou et al. | |
| 2017/0298003 A1 | 10/2017 | Rittsteiger et al. | |
| 2017/0320896 A1* | 11/2017 | Stanjek ............... | B01J 31/0212 |
| 2017/0355810 A1 | 12/2017 | Langkabel et al. | |
| 2017/0369626 A1 | 12/2017 | Stache et al. | |
| 2017/0369736 A1 | 12/2017 | Stache et al. | |
| 2018/0155515 A1 | 6/2018 | Spyrou et al. | |
| 2018/0312713 A1 | 11/2018 | Spyrou et al. | |
| 2018/0327538 A1 | 11/2018 | Lomölder et al. | |
| 2018/0339959 A1 | 11/2018 | Rittsteiger et al. | |

FOREIGN PATENT DOCUMENTS

| | | |
|---|---|---|
| DE | 35 44 601 C2 | 6/1986 |
| DE | 35 24 215 A1 | 1/1987 |
| DE | 10 2012 219324 A1 | 4/2014 |
| EP | 1 010 704 A2 | 6/2000 |
| EP | 0 709 392 B1 | 5/2001 |

OTHER PUBLICATIONS

Kreczinski et al., U.S. Appl. No. 16/354,349, filed Mar. 15, 2019.
Kreczinski et al., U.S. Appl. No. 16/354,753, filed Mar. 15, 2019.
Rüfer et al., U.S. Appl. No. 16/177,863, filed Nov. 1, 2018.
European Search Report dated Aug. 24, 2018 in EP 18164578.9 (7 pages).
Kreczinski et al., U.S. Appl. No. 16/356,026, filed Mar. 18, 2019.

* cited by examiner

*Primary Examiner* — Clinton A Brooks
*Assistant Examiner* — Kofi Adzamli
(74) *Attorney, Agent, or Firm* — Nexsen Pruet PLLC; Philip P. McCann

(57) ABSTRACT

The present invention relates to a process for preparing isocyanate containing alkoxysilane groups, in which, in the sequence of steps A) to D),
A) alkoxysilanoalkylamine is reacted with urea in the presence of an alcohol, optionally in the presence of at least one catalyst, to give alkoxysilanoalkylurethane,
B) simultaneously or successively, if used, the catalyst is removed and/or deactivated, and low boilers, medium boilers and/or high boilers are removed,
C) purified alkoxysilanoalkylurethane is thermally cleaved to release isocyanate containing alkoxysilane groups and by-product, leaving bottoms material, and
D) isocyanate containing alkoxysilane groups and by-product are separated from one another and from bottoms material and collected,
in which, in step C),
i) the bottoms material is wholly or partly discharged from the cleavage apparatus,
ii) subjected to thermal treatment and/or purification and/or an aftertreatment in the presence of alcohol and
iii) the material removed, after thermal treatment and/or purification and/or aftertreatment in step B) or C), is fed in again.

20 Claims, No Drawings

PROCESS FOR PREPARING ISOCYANATES CONTAINING ALKOXYSILANE GROUPS

CROSS REFERENCE TO RELATED APPLICATIONS

This application is a 35 U.S.C. § 119 patent application which claims the benefit of European Application No. 18164578.9 filed Mar. 28, 2018, which is incorporated herein by reference in its entirety.

FIELD

The invention relates to a process for preparing isocyanates containing alkoxysilane groups.

BACKGROUND

Isocyanates containing alkoxysilane groups are usable in a versatile manner as heterofunctional units and may find use, for example, in coatings, sealants, adhesives and elastomer materials, but are not limited to these fields of use.

Processes for preparing isocyanates containing alkoxysilane groups are known. For example, they can be obtained by reacting alkoxysilanoalkylamines with phosgene in the presence of tertiary amines (DE 35 44 601 C2, U.S. Pat. No. 9,309,271 B2), although not only the toxicity of phosgene but also the formation of chlorinated by-products and salts is disadvantageous. Alternatively, access to isocyanates containing alkoxysilane groups can also be achieved via hydrosilylation of isocyanates containing olefin groups in the presence of precious metal catalysts (EP 0 709 392 B1). Disadvantages here are generally inadequate selectivity and high catalyst demand.

A further route to alkoxysilane-containing isocyanates leads via the reaction of haloalkylalkoxysilanes with metal cyanates to form alkoxysilanoalkylurethanes and subsequent thermal cleavage of the urethanes to release the corresponding isocyanates (U.S. Pat. Nos. 3,821,218 A, 3,598,852 A, DE 35 24 2015 A1). Disadvantages here are the formation of large amounts of salt and the need to use a solvent, which is typically dimethylformamide.

U.S. Pat. No. 5,218,133 A describes a route to preparation of alkoxysilanoalkylurethanes that avoids the troublesome formation of stoichiometric amounts of salt. For this purpose, alkoxysilanoalkylamines are reacted with alkyl carbonates in the presence of basic catalysts, especially in the presence of metal alkoxides, and the reaction mixture is then neutralized.

U.S. Pat. No. 5,393,910 A describes a process for thermal cracking of alkoxysilanoalkylurethanes prepared preferably according to U.S. Pat. No. 5,218,133 A at high temperature in the gas phase. A disadvantage of this process is the need for special equipment which is stable to high temperature and thus costly. Moreover, patents that do not relate specifically to silanoisocyanates report that the high temperature required leads to reactor carbonization. This is disadvantageous because it is detrimental to plant availability.

As an alternative to urethane cleavage in the gas phase, the thermally induced release of isocyanates containing alkoxysilane groups can also be conducted in a dilute manner in inert solvents (see U.S. Pat. Nos. 5,886,205 A, 6,008,396 A). This involves adding the alkoxysilanoalkylurethane to the inert solvent and choosing a sufficiently high temperature for the solvent as to promote urethane cleavage on the one hand but to avoid unwanted side reactions as far as possible on the other hand. U.S. Pat. No. 5,886,205 A discloses, for the reaction performable in a batchwise or continuous manner, pH values of less than 8, temperatures of not more than 350° C. and a catalyst comprising at least one metal selected from Sn, Sb, Fe, Co, Ni, Cu, Cr, Ti and Pb or at least one metal compound comprising these metals. Disadvantages are the expenditure required for solvent cleaning by comparison with gas phase cleavage, and the unavoidable loss of solvent.

EP 1 010 704 A2 discloses a one- or two-stage process for preparing alkoxysilanoalkylurethanes from alkoxysilanoalkylamines, urea and alcohol. The alkoxysilanoalkylurethanes can be cleaved thermally to give isocyanates containing alkoxysilane groups. The examples in the application cited disclose a process in which 3-aminopropyltriethoxysilane is first reacted with urea and ethanol, and ammonia formed and also unconverted ethanol, low boilers and compounds of higher molecular weight are removed. The carbamate obtained is then subjected to thermal cleavage in a cracking and rectification apparatus, wherein the ethanol released is drawn off at the top of the column, the 3-isocyanatopropyltriethoxysilane is withdrawn via the side draw, and a portion of the bottoms from the rectification unit comprising unconverted urethane is recycled into the carbamate preparation. However, the process has the disadvantage that the high boilers present in the cleavage bottoms material can lead to deposits in the apparatus and adversely affect the yield of the carbamate synthesis and hence the yield over the entire process. Moreover, recycling into the carbamate synthesis unnecessarily increases the complexity associated with distillative purification of the carbamate, which is also manifested in elevated capital and energy costs. Furthermore, the proportion of values present in the stream of matter from the cleavage bottoms is not optimally exploited in the sense of exhaustion of the yield potential.

SUMMARY

The problem addressed by the present invention is thus that of avoiding the aforementioned disadvantages of the prior art. More particularly, the problem addressed by the present invention is that of providing a process for preparing isocyanates containing alkoxysilane groups from alkoxysilanoalkylamine, urea and alcohol, which shows improved yields.

DETAILED DESCRIPTION

It has now been found that, surprisingly, the present problem can be solved by the process according to the invention for preparing isocyanate containing alkoxysilane groups, in which, in the sequence of steps A) to D),
A) alkoxysilanoalkylamine is reacted with urea in the presence of an alcohol, optionally in the presence of at least one catalyst, to give alkoxysilanoalkylurethane,
B) simultaneously or successively
   if used, the catalyst is removed and/or deactivated, and
   low boilers, medium boilers and/or high boilers are removed,
C) purified alkoxysilanoalkylurethane is thermally cleaved to release isocyanate containing alkoxysilane groups and by-product, leaving bottoms material, and
D) isocyanate containing alkoxysilane groups and by-product are separated from one another and from bottoms material and collected,
in which, in step C),
   i) the bottoms material is wholly or partly discharged from the cleavage apparatus, ii) subjected to thermal treatment and/or purification and/or an aftertreatment in the presence of alcohol and iii) the material removed, after thermal treatment and/or purification and/or aftertreatment in step B) or C), is fed in again.

Here and hereinafter, a process for preparing isocyanate containing alkoxysilane groups from alkoxysilanoalkylamine with urea in the presence of an alcohol is understood in the present context to mean a process in which one or more alkoxysilanoalkylamines, urea and one or more alcohols are first used, with release of ammonia, to prepare one or more alkoxysilanoalkylurethanes, which are subsequently converted thermally to one or more isocyanates containing alkoxysilane groups and one or more by-products, especially the alcohols originally used. Preferably, the process according to the invention is a process in which an alkoxysilanoalkylamine, urea and an alcohol are first used, with release of ammonia, to prepare an alkoxysilanoalkylurethane, which is subsequently converted thermally to an isocyanate containing alkoxysilane groups and the alcohol originally used.

By virtue of the bottoms material, in step C), being removed and subjected again to thermal treatment and/or purification and/or aftertreatment of isocyanates present in the bottoms material in the presence of alcohol, the high boiler content in the bottoms material is lowered and/or the proportion of values is increased. Surprisingly, the recycling of the stream removed, which has been subjected to thermal treatment and/or purification and/or reurethanization in step B) or C) of the process, leads to an increase in the yield. Furthermore, this process regime enables a continuous process regime. Preferably, it is thus possible to conduct discharge, thermal treatment and/or purification and/or aftertreatment with alcohol and feeding of the bottoms material continuously. More preferably, the bottoms material is removed and purified and isocyanates present in the bottoms material are treated again with alcohol and the bottoms material purified is fed back into step B) or C).

The usable alkoxysilanolamines may in principle have any structural formula. They may have, for example, two amino groups or else one or more ester or ether groups between the alkoxysilane function and the amino group. Preferably, however, the alkoxysilanoalkylamine used in step A) has the formula (1)

$$R^3{}_m(OR^2)_{3-m}Si\text{—}R^1\text{—}NH_2 \quad (1)$$

where $R^3$, $R^2$ and $R^1$ are each independently identical or different hydrocarbyl radicals having 1-6 carbon atoms, where these may be linear, branched or cyclic, and m is 0-2. Preferably, m is 0 and $R^1$ is methyl or propyl, and $R^2$ is methyl or ethyl.

The urea used is preferably unconditioned. This means that it must not have been surface-treated with inorganic substances (for example with talc, bentonite, kieselguhr, diatomaceous earth, kaolin, other silicatic substances that find use as anticaking agents, sulfur or oil), originate from a urea melt treated with formaldehyde (including paraformaldehyde) or have been surface-treated with formaldehyde (including paraformaldehyde). Preferably, the maximum formaldehyde concentration (including paraformaldehyde) of the urea used is less than 0.10% by weight, preferably less than 0.01% by weight and more preferably less than 0.001% by weight.

The customary commercial form of urea produced on the industrial scale is that of prills, i.e. small particles having a diameter of 1-3 mm. Even in the case of very low water contents of <0.1%, crystalline urea has such a significant tendency to caking that it is unsuitable for loose storage in large amounts. An improvement in the storage properties of urea prills, which is necessary, for example, in the case of silo storage of large amounts, is achieved by subsequent surface treatment of the prills with powdery substances, especially with talc, bentonite, kieselguhr, diatomaceous earth, other silicatic materials, sulfur and also by spraying with small amounts of oil.

Nowadays, the urea industry adds preferably formaldehyde to the urea melt prior to prilling at up to 0.6% by weight (see also Ullmann's Encyclopedia of Industrial Chemistry, Release 2006, 7th Edition) in order to increase the stability of the prills. This measure serves to prevent breakdown and caking in the course of transport and to improve storage stability.

Urea from a urea melt treated with formaldehyde (including paraformaldehyde) prior to prilling or pelletization and urea surface-treated with formaldehyde (including paraformaldehyde), likewise an industrially practised measure for improving the storage stability of the prills, as, for example, in the process described in EP 1 010 704 A2 as well, leads to formation of unwanted by-products in both stages, urethane synthesis and isocyanate release. The by-products formed are removable only inadequately even by complex purification procedures at the alkoxysilanoalkylurethane stage.

In the equipment for thermal cleavage of the alkoxysilanoalkylurethane to give the isocyanate containing alkoxysilane groups, both the by-products from the urethane stage itself that have not been removed quantitatively and any by-product spectrum newly generated therefrom lead to contamination of the target product, which has an adverse effect on product colour and storage stability. These effects can be attenuated by a combination of elevated distillation complexity and removal of a generous first fraction. Disadvantages that result in this case are, however, elevated energy demands, elevated capital costs for the distillation setup and a reduction in the possible yield and hence efficiency with regard to maximum exploitation of the feedstocks.

The advantage occasioned by the use of unconditioned urea is thus that removal of the by-product spectrum typically generated with the distillation and rectification apparatuses described for purification of the isocyanates containing alkoxysilane groups can be dispensed with and leads to product qualities having a profile of properties for application purposes that enables use in further upgrading stages without additional workup steps.

The removal of the by-product spectrum generated in the alkoxysilanoalkylurethane stage from formaldehyde and/or from formaldehyde-containing components of the unconditioned urea used, in the reaction with alkoxysilanoalkylamines in the presence of alcohols, is not required and hence the use of an additional distillation is unnecessary. Owing to the avoidance of by-products in the alkoxysilanoalkylurethane stage, in addition, a further by-product spectrum in the thermal cleavage of the alkoxysilanoalkylurethanes to give isocyanates containing alkoxysilane groups is subsequently avoided. In this stage too, the additional distillation complexity in combination with a removal of a generous first fraction to achieve the desired isocyanate purities is superfluous.

The inventive use of unconditioned urea thus reduces the energy demand, increases the overall process yield and enhances the economic viability of the process.

The unconditioned urea can be used irrespective of the administration form. Preferably, the unconditioned urea is used in the form of prills, pellets, crystals or a melt or solution.

The alcohol used preferably has the formula

$$R^4\text{—OH} \qquad (2)$$

where $R^4$ is a linear, branched or cyclic hydrocarbyl radical having 1-6 carbon atoms. Further preferably, $R^4$ corresponds to the $R^2$ radical in formula (2). Preferred alcohols are methanol, ethanol, 1-propanol, 1-butanol, 2-butanol, 1-hexanol or cyclohexanol.

The urethane can be synthesized from alkoxysilanoalkylamine, urea and alcohol in the presence or absence of at least one catalyst. Preferably, the process according to the invention is conducted without a catalyst since it is thus possible to avoid complex removal of the catalyst. The present invention thus preferably provides a process for preparing isocyanate containing alkoxysilane groups, in which, in the sequence of steps A) to D), A) alkoxysilanoalkylamine is reacted with urea in the presence of an alcohol to give alkoxysilanoalkylurethane,
B) simultaneously or successively, low boilers, medium boilers and/or high boilers are removed,
C) purified alkoxysilanoalkylurethane is thermally cleaved to release isocyanate containing alkoxysilane groups and by-product, leaving bottoms material, and
D) isocyanate containing alkoxysilane groups and by-product are separated from one another and from bottoms material and collected, in which, in step C),
i) the bottoms material is wholly or partly discharged from the cleavage apparatus,
ii) subjected to thermal treatment and/or purification and/or an aftertreatment in the presence of alcohol and
iii) the material removed, after thermal treatment and/or purification and/or aftertreatment in step B) or C), is fed in again.

Nevertheless, the reaction rate can be increased by using at least one catalyst. Suitable catalysts are preferably inorganic or organic compounds containing one or more, preferably one, cation of metals of groups IA, IB, IIA, IIB, IIIA, IIIB, IVA, IVB, VA, VB, VIB, VIIB and VIIIB of the Periodic Table, defined according to Handbook of Chemistry and Physics 14$^{th}$ Edition, published by Chemical Rubber Publishing Co. 2310 Superior Ave. N.E. Cleveland, Ohio. Preferred catalysts are halides (especially chlorides and bromides), sulfates, phosphates, nitrates, borates, alkoxides, phenoxides, sulfonates, oxides, oxide hydrates, hydroxides, carboxylates, chelates, carbonates and thio- or dithiocarbamates of these cations. Further-preferred catalysts have cations of the following metals: lithium, sodium, potassium, magnesium, calcium, aluminum, gallium, tin, lead, bismuth, antimony, copper, silver, gold, zinc, mercury, cerium, titanium, vanadium, chromium, molybdenum, manganese, iron, cobalt and nickel. Very particularly preferred catalysts are the following compounds: lithium ethoxide, lithium butoxide, sodium methoxide, potassium tert-butoxide, magnesium ethoxide, calcium methoxide, tin(II) chloride, tin(IV) chloride, lead acetate, aluminum trichloride, bismuth trichloride, copper(II) acetate, copper(II) chloride, zinc chloride, zinc octoate, titanium tetrabutoxide, vanadium trichloride, vanadium acetonylacetate, manganese(II) acetate, iron(II) acetate, iron(III) acetate, iron oxalate, cobalt chloride, cobalt naphthenate, nickel chloride and nickel naphthenate. The catalysts may optionally also be used in the form of their ammoniates.

For preparation of the alkoxysilanoalkylurethane in reaction stage A), alkoxysilanoalkylamine is used together with urea and alcohol preferably in a molar ratio of these three components of 1:1.01:3.0 to 1:1.5:10, preferably 1:1.02:4 to 1:1.3:9. Preferably, the reaction is conducted in the absence or presence of catalysts at reaction temperatures of 140-270° C., preferably 160-250° C., and under a pressure which, depending on the alcohol used, is between 2-80 bar, preferably 5-40 bar, within 2 to 20 hours, preferably 4-9 hours. As well as urea, it is additionally also possible for dialkyl carbonates and/or alkyl carbamates to be present as carbonylating agent. However, preference is given to reacting exclusively alkoxysilanoalkylamine, urea and alcohol with one another.

In the course of the conversion of the reaction mixture in step A), ammonia is released. It is preferably already removed from the reaction equilibrium in the course of reaction. On discharge of the ammonia from the reactor, it should be ensured that the wall temperatures of the reactor and of the discharge tube are above 60° C. in order that coverage by ammonium carbamate, which is formed in minimal amounts from ammonia and carbon dioxide by breakdown of urea, can be avoided. For example, it has been found to be useful to conduct the reaction in a pressure distillation reactor, wherein the reaction mixture is guided in countercurrent to alcohol vapours introduced at the bottom and, in this way, such intense mixing of the liquid on the trays, each of which effectively corresponds to a cascade stage, is effected. The vaporous mixture of alcohol and ammonia drawn off at the top can, preferably under the pressure of the pressure distillation reactor and without prior condensation, be guided into a distillation column in order to obtain ammonia-free alcohol which is recycled into the bottom of the pressure distillation reactor and the column. In order to prevent coverage of the reflux condenser with ammonium carbamate, an appropriate proportion of alcohol is permitted therein to adjust the temperature at the top to at least 60° C.

The reaction can be effected in a batchwise reactor, a continuously operated stirred tank cascade, or a pressure distillation reactor. It is preferably conducted in a pressure distillation reactor.

In step B), simultaneously or successively, the catalyst (if used) is removed and/or deactivated, and low boilers, medium boilers and/or high boilers are removed.

If a catalyst is used, it can first be removed and/or deactivated, and then low boilers, medium boilers and/or high boilers can be removed. It is also possible first to remove low boilers, medium boilers and/or high boilers and then to remove and/or deactivate the catalyst. It is also possible to conduct both component steps simultaneously. However, preference is given to first deactivating the catalyst and then removing low boilers, solids, salt burdens and/or high boilers.

Especially when the catalyst is a metal alkoxide or metal phenoxide, it can preferably first be deactivated by adding an acid, ideally using at least an equimolar amount of acid.

The catalyst or deactivated catalyst is preferably removed together with the high boiler components.

Low boilers are preferably alcohol and any ammonia still present. Medium boilers are preferably further alcohol and any dialkyl carbonates and alkyl carbamates present. High boilers are preferably unwanted by-products from the urethane synthesis. The removal can be effected in two or three stages. Preferably, low boilers are removed via a flash evaporation, and medium and high boilers by one or two stages in a falling-film evaporator and/or thin-film evaporator. Preference is given to conducting the removal of the low boilers, medium boilers and/or high boilers in three separate component steps. Further preferably, the low boilers can be removed by flash evaporation, the medium boilers via a first falling-film evaporation or thin-film evaporation, and the high boilers via a short-path evaporation or a (further) thin-film evaporation. The low boilers are preferably removed first, then the medium boilers and finally the high boilers.

The low boilers are preferably removed by an expansion of the reaction mixture from the pressure level of reaction stage A) to a pressure of 1-500 mbar, preferably 2-250 mbar. In this way, a separation is effected into gaseous vapours comprising the predominant amount of alcohol, and a liquid output consisting preferably of alcohol and dialkyl carbonate. The removal of any further low boilers still present and of the medium boilers in the liquid output is preferably effected at 70-160° C., preferably 90-140° C., and a pressure of 0.1-40 mbar, preferably 1-20 mbar. Preference is given to using a falling-film or thin-film evaporator.

The low and medium boilers removed, especially the alcohol removed and any carbonylating medium boilers present, such as dialkyl carbonates and/or alkyl carbamates, can preferably be recycled into the reaction stage A). Further preferably, these can be purified by distillation after removal and before recycling.

The high boilers are preferably removed via a short-path evaporation or a thin-film evaporation, most preferably via a thin-film evaporation, at a pressure of 1-30 mbar, preferably 2-20 mbar, a temperature of 80-220° C., preferably 100-200° C., and a cut ratio of distillate/residue of greater than 80% by weight:20% by weight, preferably greater than 85% by weight:15% by weight, more preferably greater than 90% by weight:10% by weight.

The thermal cleavage C) gives rise to isocyanate containing alkoxysilane groups and by-product, preferably alcohol. Preference is given to conducting the thermal cleavage without addition of solvent.

The thermal cleavage in step C) is preferably conducted in the presence of a catalyst and without solvent, at a temperature of 140 to 280° C., preferably 160 to 260° C., and under a pressure of 0.5-200 mbar, preferably 1.0-100 mbar. The catalyst concentration is preferably 0.5-250 ppm, preferably 1-100 ppm.

In the thermal cleavage, the bottoms material is wholly or partly discharged from the cleavage apparatus. Preference is given to discharging a portion of the reaction mixture constantly from the bottom, preferably 1% to 90% by weight based on the feed, preferably 5% to 60% by weight based on the feed. Correspondingly, corresponding amounts of bottoms material are preferably discharged from the cleavage apparatus.

The thermal cleavage is preferably effected partially, meaning that the conversion of product from step B)/distillate to isocyanate containing alkoxysilane groups is chosen freely and is typically within a range of 10-95% by weight, preferably 20-85% by weight, of the amount supplied (feed). Preferably, a portion of the reaction mixture comprising not only unconverted urethane but also high-boiling by-products and other reutilizable and unutilizable by-products is discharged continuously from the bottom. The volume of the discharge is guided by factors including the desired conversion and the desired capacity of the cleavage reaction and can easily be determined experimentally. It is preferably 1% to 90% by weight, preferably 5% to 60% by weight, based on the feed.

Catalysts employed for chemical cleavage of the urethanes containing alkoxysilane groups are, for example, the inorganic and organic compounds that catalyse urethane formation. Preference is given to using chlorides of zinc or of tin and oxides of zinc, manganese, iron or cobalt, where the catalyst is metered into the stream of matter from purification step B) comprising essentially urethane, especially the stream of matter from step B) iv) and any other recycled streams before they are fed into the cleavage, in the form of a 0.01-25% by weight, preferably 0.05-10% by weight, solution or suspension in alcohol, in an amount of 0.5-250 ppm, preferably 1-100 ppm. In principle, but not preferably, the urethane cleavage can also be conducted without added catalyst.

Suitable cleavage apparatuses are preferably cylindrical cleavage reactors, for example tubular ovens or preferably evaporators, for example falling-film, thin-film or bulk evaporators, for example Robert evaporators, Herbert evaporators, Caddle-type evaporators, Oskar evaporators and heating cartridge evaporators.

The important factor is basically to keep the average residence time of the isocyanate groups that are inevitably released in the deblocking of the alcohol in the cleavage zone as short as possible and hence to restrict unwanted side reactions to a minimum.

Preferably, the cleavage is conducted in a combined cleavage and rectification column which, for the supply of energy, is equipped at the bottom with a falling-film evaporator, in the upper part with a device for drawing off product or crude product, and at the top with a condenser for the reflux and the drawing-off of alcohol. Optionally, devices for additional energy input can also be installed in the lower third.

The cleavage products formed in the thermal cleavage, composed in particular of alcohol and isocyanate containing alkoxysilane groups, may preferably be separated by rectification at temperatures of 140-280° C., preferably 160-260° C., and a pressure of 0.5-200 mbar, preferably 1-100 mbar, into alcohol and isocyanate containing alkoxysilane groups, where the isocyanate may possibly still contain proportions of the underlying urethane. This separation can be conducted, for example, in the cleavage column of the above-mentioned combined cleavage and rectification column.

The bottoms material comprising high boilers from the cleavage apparatus, after discharge, is preferably subjected to thermal treatment and/or purified and/or subjected to an aftertreatment in the presence of alcohol, and is then preferably fed into step B) or C) again. This can reduce the high boiler content and increase the proportion of values in the mixture of matter. In addition, a continuous process regime of steps C) and D) is thus enabled. To date, it has only been possible to continuously conduct steps A) and B). Thus, the inventive bottoms discharge with recycling enables a continuous process regime of all steps A) to D). More preferably, the bottoms material is removed and purified and isocyanates present in the bottoms material are treated again with alcohol and the bottoms material purified is fed back into step B) or C).

The thermal aftertreatment is preferably effected at a temperature of 190-290° C. over a period of 0.2 to 4 h, further preferably at 190-250° C. over a period of 0.5-1.5 h at standard pressure.

The purification step is preferably effected by distillation. This is preferably done by distilling the discharged bottoms material under reduced pressure and at a temperature of 190-290° C., such that alkoxysilanoalkyl isocyanate and/or alkoxysilanoalkylurethane formed in the bottoms is separated from the high boilers. The resultant distillate can be fed to step B) or C) of the process. Preferably, the distillate obtained is fed to the short-path or thin-film evaporation B) iv) or the cleavage C).

The bottoms discharge from the cleavage stage C) contains, as well as unconverted urethane, additionally high-boiling by-products and other reutilizable and unutilizable by-products. The reutilizable component, i.e. the values component of the mixture of matter—and hence the overall yield of the process—can be increased by controlled thermal aftertreatment in combination with a distillative purification of the material. The material is separated into a values stream and a waste stream, with discharge of the waste stream which is rich in high boilers from the process, which is discarded or recycled.

The discharged bottoms material comprising alkoxysilanoalkyl isocyanate and/or alkoxysilanoalkylurethane can further preferably, with or without a prior purification step, be subjected to an optional further aftertreatment in order to increase the values content of the mixture of matter. For this purpose, the optionally distilled bottoms material is converted in the presence of an alcohol of the formula $R^4OH$ with $R^4$=linear, branched or cyclic hydrocarbyl radical having 1-6 carbon atoms, preferably the recycled alcohol formed in the cleavage C), at 25-100° C. and a pressure of 0.5-20 bar, preferably 1-15 bar, in the presence or absence of a catalyst. Useful catalysts include all solid-state catalysts that promote the NCO/OH reaction, e.g. tin octoate, dibutyltin laurate, tin dichloride, zinc dichloride or triethylamine. The molar ratio of NCO groups and OH groups is preferably up to 1:100, preferably up to 1:60 and more preferably up to 1:30. The reaction can be conducted in a batch reactor, a cascade, or else a tubular reactor in the absence or presence of a catalyst. Preference is given to conducting the reaction in a cascade or in a tubular reactor. Alkoxysilanoalkyl isocyanates formed are converted here to the corresponding urethanes ("reurethanization") and recycled.

The steps of thermal aftertreatment and separation into values stream and waste stream and reurethanization can be conducted successively or in parallel. A batch reactor, for example, is suitable for the thermal aftertreatment, wherein the components can be separated in parallel and/or thereafter in a distillation column or with the aid of a falling-film, short-path or thin-film evaporator, for example also by recycling into the high boiler removal B) iv). Less preferably, the separating operation can also be effected by extraction. Alternatively, the steps can also be effected in a falling-film, thin-film or short-path evaporator, and it is also possible to use multiple evaporators connected in series or in parallel.

The thermal aftertreatment can be effected in the presence or absence of typical urethanization catalysts. It is also possible to dispense with thermal aftertreatment entirely, but this measure sacrifices yield potential.

With a given capacity, for an optimized increase in the values content, the parameters of residence time and temperature in the thermal aftertreatment are among the crucial parameters, the optimum of which depends on the dimensions and basic setup of the process configuration and can easily be ascertained experimentally by the person skilled in the art.

In a particularly preferred variant of the invention, the bottoms discharge from the cleavage stage C) is subjected to a thermal aftertreatment in a stirred tank with a distillation column connected downstream at 190-290° C., preferably 215-265° C., under reduced pressure, and then run into a thin-film or short-path evaporator. The evaporator efflux comprising essentially high boilers is discharged from the process, and the distillates containing values are recycled into the process, preferably into the high boiler removal B) iv) or into the reaction of the discharged bottoms material with alcohol.

In step D), isocyanate containing alkoxysilane groups and by-product, preferably alcohol, are separated from bottoms material and collected. Further preferably, isocyanate containing alkoxysilane groups and by-product are separated from one another, preferably by rectification. Preferably, the rectification is conducted at temperatures of 140-280° C., preferably 160-260° C., and a pressure of 0.5-200 mbar, preferably 1-100 mbar. The isocyanate obtained may possibly still contain fractions of the parent urethane. This separation can be conducted, for example, in the cleavage column of the combined cleavage and rectification column mentioned.

The isocyanate containing alkoxysilane groups which is preferably obtained by rectification can optionally be purified further by distillation at a temperature of 80-220° C., preferably 100-200° C., and under a pressure of 0.5-200 mbar, preferably 1-100 mbar, and isolated as a product of high purity. In this case too, it is preferably possible to continuously discharge a portion of the distillation bottoms and combine it with the discharged bottoms material from the cleavage C).

The isocyanates preparable by the process preferably have the formula (3)

$$R^3{}_m(OR^2)_{3-m}Si—R^1—NCO \qquad (3)$$

where $R^3$, $R^2$ and $R^1$ are each independently identical or different hydrocarbyl radicals having 1-6 carbon atoms, which may be branched or cyclic, or else may be integrated together to form a cyclic system, and m is 0-2. Preferably, m=0. $R^1$ is preferably propyl. $R^2$ is preferably methyl or ethyl. Very particular preference is given to compounds where m is 0 and $R^1$ is methyl or propyl, and $R^2$ is methyl or ethyl.

The process according to the invention is very particularly suitable for preparation of isocyanatopropyltrimethoxysilane and isocyanatopropyltriethoxysilane.

Advantages of the process according to the invention are in particular that isocyanates containing alkoxysilane groups can be prepared with high plant availability in continuous operation with high yields. What is advantageous about the multistage process according to the invention is particularly the fact that, when alkoxysilanoalkylamines of the formula (1) are used as starting material for the continuous preparation of isocyanates containing alkoxysilane groups, deposits that are promoted particularly by the high boiler components that are of relatively high viscosity by nature can be largely avoided and good plant availability and a good process yield are assured even over the long term. In addition, it is an advantage of the multistage process according to the invention that it allows the process yield to be additionally increased owing to the downstream thermal aftertreatment—for example by reactive distillation—and promotes more efficient raw material utilization in this way.

The above-described optional sequence of thermal aftertreatment—for example by reactive distillation, bottoms discharge, separation into values and wastes, urethanization of the values and recycling of the urethanized values stream into the process can in principle also be conducted in the following sequence: urethanization of the bottoms discharge, thermal aftertreatment, separation into values and wastes, and recycling into the process.

The multistage process according to the invention for preparation of isocyanates containing alkoxysilane groups with recycling and discharge of the by-products can ensure a process that runs continuously without disruption with high selectivity for a long period, especially in the case of use of unconditioned urea and in the case of a thermal aftertreatment. The process according to the invention is suitable for preparation of isocyanates containing alkoxysilane groups and having 1-16 carbon atoms between the silicon atom and the isocyanate group, but especially for preparation of isocyanatopropyltrimethoxysilane and isocyanatopropyltriethoxysilane.

The isocyanates containing alkoxysilane groups that have been prepared are suitable for use in coatings on different substrates, sealants, adhesives and elastomer materials—or else for specific modification of resins or discrete molecules—but without being restricted to these fields of use.

The invention is elucidated in detail by the following examples:

Example 1

Inventive Preparation of Isocyanatopropyltrimethoxysilane

The uppermost tray of a pressure distillation reactor was charged with 13.9 kg/h of AMMO (aminopropyltrimethoxysilane), 4.9 kg/h of unconditioned urea and 10.2 kg/h of methanol, and the reaction mixture was boiled with continuous removal of the ammonia released at 220° C. and an average residence time of 8.5 h. The reaction output, together with the stream of matter from the reurethanization, was freed of excess alcohol and further low and medium boilers by flash evaporation at 250 mbar and subsequent thin-film evaporation at 125° C. and 10 mbar, and the crude urethane obtained was subjected to a further thin-film evaporation at 185° C. and 5 mbar. The TFE distillate (24.7 kg/h) was run continuously into the circulation of the cleavage and rectification column, and the deblocking reaction was conducted at a temperature of 195° C. and a bottom pressure of 60 mbar in the presence of a steady-state concentration of tin dichloride of 16 ppm. The cleavage gases IPMS and methanol were condensed out in two successive condensers, it being possible to reuse the methanol obtained as the top product, after further distillation, as raw material, and the IPMS was withdrawn at the side draw with a purity of >98% in an amount of 15.0 kg/h, which corresponds to a continuous yield of 94%. To maintain the mass balance within the cleavage and rectification column, and for avoidance of deposits and possibly blockage of the cleavage apparatus, and for regeneration of values, a substream was continuously discharged from the circuit and run at 225° C. and 30 mbar via a stirred tank with distillation apparatus into a thin-film evaporator (215° C., 5 mbar). The distillate streams from the distillation apparatus and the thin-film evaporator were combined with methanol, and the combined stream (6.5 kg/h) was converted in a tubular reactor at 65° C. until urethanization of all NCO groups was complete. The reurethanizate stream was recycled into the flash stage.

Example 2

Non-inventive Preparation of Isocyanatopropyltrimethoxysilane

The uppermost tray of a pressure distillation reactor was charged with 15.5 kg/h of AMMO (aminopropyltrimethoxysilane), 5.5 kg/h of urea (standard) and 11.6 kg/h of methanol, and the reaction mixture was boiled with continuous removal of the ammonia released at 220° C. and an average residence time of 8.5 h. The reactor output, together with the stream of matter from the reurethanization, was freed of excess alcohol and further low and medium boilers by flash evaporation at 250 mbar and subsequent thin-film evaporation at 125° C. and 10 mbar, and the crude urethane obtained was subjected to a further thin-film evaporation at 185° C. and 5 mbar. The TFE distillate (25.8 kg/h) was run continuously into the circulation of the cleavage and rectification column, and the deblocking reaction was conducted at a temperature of 210° C. and a bottom pressure of 75 mbar in the presence of a steady-state concentration of tin dichloride of 30 ppm. The cleavage gases IPMS and methanol were condensed out in two successive condensers, it being possible to reuse the methanol obtained as the top product, after further distillation, as raw material, and the IPMS was withdrawn at the side draw with a purity of >98% in an amount of 15.5 kg/h, which corresponds to a continuous yield of 88%. To maintain the mass balance within the cleavage and rectification column, and for regeneration of values, a substream was continuously discharged from the circuit and combined with methanol, and the combined stream (7.8 kg/h) was converted in a tubular reactor at 65° C. until urethanization of all NCO groups was complete. The reurethanizate stream was recycled into the flash stage.

Example 3

Non-inventive Preparation of Isocyanatopropyltrimethoxysilane

The uppermost tray of a pressure distillation reactor was charged with 15.1 kg/h of AMMO (aminopropyltrimethoxysilane), 5.4 kg/h of urea (standard) and 11.5 kg/h of methanol, and also the substream from the circulation, and the reaction mixture was boiled with continuous removal of the ammonia released at 220° C. and an average residence time of 8.5 h. The reaction output, together with the stream of matter from the reurethanization, was freed of excess alcohol and further low and medium boilers by flash evaporation at 250 mbar and subsequent thin-film evaporation at 125° C. and 10 mbar, and the crude urethane obtained was subjected to a further thin-film evaporation at 185° C. and 5 mbar. The TFE distillate (25.4 kg/h) was run continuously into the circulation of the cleavage and rectification column, and the deblocking reaction was conducted at a temperature of 205° C. and a bottom pressure of 70 mbar in the presence of a steady-state concentration of tin dichloride of 35 ppm. The cleavage gases IPMS and methanol were condensed out in two successive condensers, it being possible to reuse the methanol obtained as the top product, after further distillation, as raw material, and the IPMS was withdrawn at the side draw with a purity of >98% in an amount of 15.0 kg/h, which corresponds to a continuous yield of 87%. To maintain the mass balance within the cleavage and rectification column, and for regeneration of values, a substream was continuously discharged from the circuit and combined with methanol, and the combined stream (7.3 kg/h) was recycled into the pressure distillation reactor.

The invention claimed is:
1. A process for preparing isocyanate containing alkoxysilane groups, in which, in the sequence of steps A) to D),
   A) reacting an alkoxysilanoalkylamine with urea in the presence of an alcohol, optionally in the presence of at least one catalyst, to give alkoxysilanoalkylurethane,

B) simultaneously or successively producing purified alkoxysilanoalkylurethane by
  removing or deactivating the catalyst, and
  removing low boilers, medium boilers and/or high boilers,
C) thermally cleaving the purified alkoxysilanoalkylurethane in a cleavage apparatus to release isocyanate containing alkoxysilane groups and by-product, leaving bottoms material of the cleaving the purified alkoxysilanoalkylurethane, wherein the bottoms material of the cleaving the purified alkoxysilanoalkylurethane is wholly or partly discharged from the cleavage apparatus, and
D) separating the isocyanate containing alkoxysilane groups and by-product from one another and from bottoms material and collected,
wherein
  i) the bottoms material is wholly or partly discharged from the cleavage apparatus,
  ii) subjected to thermal treatment and/or purification and/or an aftertreatment in the presence of alcohol and
  iii) the material removed, after thermal treatment and/or purification and/or aftertreatment in step B) or C), is fed in again.

2. The process according to claim 1, wherein the alkoxysilanoalkylamine has the formula (1)

$$R^3_m(OR^2)_{3-m}Si-R^1-NH_2 \quad (1)$$

where $R^3$, $R^2$ and $R^1$ are each independently identical or different hydrocarbyl radicals having 1-6 carbon atoms, where these may be linear, branched or cyclic, and m is 0-2 and step C) is conducted without solvent and in the presence of a catalyst at a temperature of 140-280° C. and a pressure of 0.5-200 mbar.

3. The process according to claim 2, wherein in step B), in the sequence of steps i) to iv),
  i) removing or deactivating the catalyst,
  ii) removing low boilers, medium boilers and/or high boilers in three separate component steps by removing the low boilers via flash evaporation,
  iii) removing the medium boilers via falling-film evaporation or thin-film evaporation and
  iv) removing the high boilers via short-path evaporation or thin-film evaporation.

4. The process according to claim 3, wherein low and medium boilers removed are recycled into the urethane synthesis A).

5. The process according to claim 2, wherein the urea used is unconditioned.

6. The process according to claim 2, wherein the alcohol has the formula (2)

$$R^4-OH \quad (2)$$

where $R^4$ is a linear, branched or cyclic hydrocarbyl radical having 1-6 carbon atoms.

7. The process according to claim 2, wherein the alkoxysilanoalkylamine is used together with urea and alcohol in a molar ratio of these three components of 1:1.01:3.0 to 1:1.5:10.

8. The process according to claim 2, wherein in step A), ammonia formed during the reaction is removed.

9. The process according to claim 1, wherein the urea used is unconditioned.

10. The process according to claim 1, wherein the alcohol has the formula (2)

$$R^4-OH \quad (2)$$

where $R^4$ is a linear, branched or cyclic hydrocarbyl radical having 1-6 carbon atoms.

11. The process according to claim 1, wherein alkoxysilanoalkylamine is used together with urea and alcohol in a molar ratio of these three components of 1:1.01:3.0 to 1:1.5:10.

12. The process according to claim 1, wherein in step A), ammonia formed during the reaction is removed.

13. The process according to claim 1, wherein the thermal cleavage C) is conducted without solvent and in the presence of a catalyst at a temperature of 160-260° C. and a pressure of 1.0-100 mbar, and wherein the catalyst concentration is 0.5-255 ppms.

14. The process according to claim 13, wherein the catalyst concentration is 1-100 ppm.

15. The process according to claim 1, wherein, in step C), an amount of bottoms material corresponding to 1-90% by weight based on the feed is discharged from the bottom and added again in step B) or C).

16. The process according to claim 1, wherein the discharged bottoms material
  is subjected to thermal treatment at a temperature of 190-290° C. over a period of 0.2 to 4 h and/or
  is distilled under reduced pressure and at a temperature of 190-290° C. and/or
  is converted in the presence of an alcohol of the formula $R^2OH$ with $R^2$=linear, branched or cyclic hydrocarbyl radical having 1-6 carbon atoms at 25-100° C. in the presence or absence of a catalyst.

17. The process according to claim 16, wherein no reaction with alcohol is conducted.

18. The process according to claim 1, wherein the separation in step D) is a rectification.

19. The process according to claim 18, wherein the isocyanate obtained after the rectification is additionally purified by distillation.

20. The process according to claim 1, wherein from 5 to 60% by weight based on the feed of bottoms material of the cleaving the purified alkoxysilanoalkylurethane is discharged from the cleavage apparatus.

* * * * *